United States Patent
Kamiya et al.

(10) Patent No.: US 8,037,719 B2
(45) Date of Patent: Oct. 18, 2011

(54) METHOD FOR MANUFACTURING BASALT FIBER

(75) Inventors: Sumio Kamiya, Toyota (JP); Hironori Sasaki, Tsusima (JP); Noriaki Nakagawa, Kasugai (JP)

(73) Assignees: Toyota Jidosha Kabushiki Kaisha, Toyota-shi, Aichi-ken (JP); Nakagawa Sangyo Co., Ltd., Nishikasugai-gun, Aichi (JP)

( * ) Notice: Subject to any disclaimer, the term of this patent is extended or adjusted under 35 U.S.C. 154(b) by 1195 days.

(21) Appl. No.: 11/454,842

(22) Filed: Jun. 19, 2006

(65) Prior Publication Data

US 2007/0000721 A1    Jan. 4, 2007

(30) Foreign Application Priority Data

Jun. 20, 2005 (JP) .................. 2005-178861

(51) Int. Cl.
 *C03B 37/02* (2006.01)
 *C03C 13/06* (2006.01)
(52) U.S. Cl. ........ 65/475; 65/479; 501/35; 501/36
(58) Field of Classification Search ........ 65/475–381
 See application file for complete search history.

(56) References Cited

U.S. PATENT DOCUMENTS

| | | | | |
|---|---|---|---|---|
| 3,310,412 A | * | 3/1967 | Hofstadt et al. | 501/35 |
| 3,557,575 A | * | 1/1971 | Beall | 65/33.9 |
| 4,008,094 A | * | 2/1977 | Beall et al. | 252/62.59 |
| 4,199,336 A | * | 4/1980 | Rittler | 65/376 |
| 4,560,606 A | * | 12/1985 | Rapp et al. | 428/141 |
| 4,764,487 A | * | 8/1988 | Lewis | 501/70 |
| 5,962,354 A | * | 10/1999 | Fyles et al. | 501/36 |
| 6,067,821 A | * | 5/2000 | Jackson et al. | 65/482 |
| 6,125,660 A | * | 10/2000 | Gorobinskaya et al. | 65/474 |

(Continued)

FOREIGN PATENT DOCUMENTS

CN      1237948 A      12/1999

(Continued)

OTHER PUBLICATIONS

Ivanovich et. al. "method fo continuous fiber making from the melt of Basalt rocks"; Russian Patent No. RU(11)2102342(13)C1—Published Jan. 20, 1998.*

(Continued)

*Primary Examiner* — Jason L. Lazorcik
(74) *Attorney, Agent, or Firm* — Finnegan, Henderson, Farabow, Garrett & Dunner, LLP

(57) ABSTRACT

Basalt filament is manufactured in such a manner that the fiber diameter can be controlled and the filament is not severed during the winding step. A network former and a glass modifier are formed and maintained with respect to basalt rock ore, and the crystallization and binding of basalt fiber are inhibited, the heat-resistance property of basalt fiber is greatly improved from the conventional 750° C. to 850 or 900° C., and significant cost reduction is achieved over conventional products. The method includes the steps of: grinding basalt rock as a material; washing a resultant ground rock; melting the ground rock that has been washed; transforming a molten product into fiber; and drawing the fiber in an aligned manner, and winding it. The temperature of the molten product in the melting step is 1400 to 1650° C., and log $\eta$ is 2.15 to 2.35 dPa·s and preferably 2.2 to 2.3 dPa·s, where $\eta$ is the viscosity of the molten product.

4 Claims, 1 Drawing Sheet

U.S. PATENT DOCUMENTS

Figure 1:
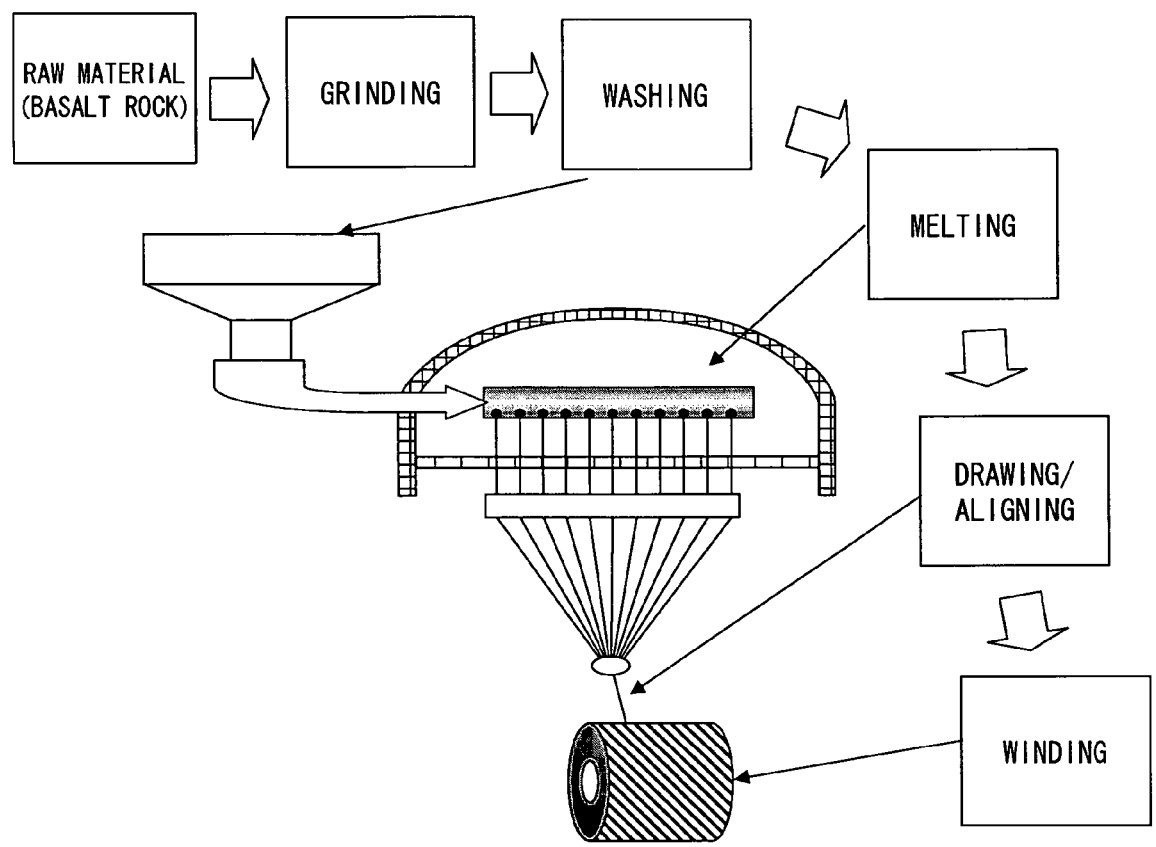

| | | | |
|---|---|---|---|
| 6,158,249 A * | 12/2000 | Battigelli et al. | 65/522 |
| 6,346,494 B1 * | 2/2002 | Jensen et al. | 501/36 |
| 6,647,747 B1 * | 11/2003 | Brik | 65/492 |
| 7,530,240 B2 * | 5/2009 | Kibol | 65/474 |
| 7,767,603 B2 * | 8/2010 | Kamiya et al. | 501/36 |
| 2002/0069678 A1 * | 6/2002 | Aslanova | 65/475 |
| 2004/0028630 A1 * | 2/2004 | Gitomer et al. | 424/70.1 |
| 2005/0223752 A1 * | 10/2005 | Kibol | 65/474 |
| 2006/0218972 A1 * | 10/2006 | Brik | 65/492 |
| 2006/0287186 A1 * | 12/2006 | Kamiya et al. | 501/36 |
| 2009/0178439 A1 * | 7/2009 | Bauer | 65/66 |

FOREIGN PATENT DOCUMENTS

| | | |
|---|---|---|
| CN | 1272561 A | 11/2000 |
| EP | 0705799 A1 | 4/1996 |
| EP | 0957068 A1 | 11/1999 |
| EP | 1 731 490 A1 | 12/2006 |
| JP | 9-500080 | 1/1997 |
| JP | 2000-511150 | 8/2000 |
| JP | 2001-508389 | 6/2001 |
| JP | 2004-293500 | 10/2004 |
| KR | 20030075660 | 9/2003 |
| RU | 2039019 C1 | 7/1995 |
| RU | 2225374 C2 | 9/2003 |
| WO | WO 93/17975 | 9/1993 |
| WO | WO 2005/009911 A2 | 2/2005 |

OTHER PUBLICATIONS

Grigor'jevna et. al., "Method for basalt Fiber Production and Device for its Accomplishment"; Russian Patent No. RU (11)2118300(13) C1—Published Nov. 19, 1998.*

Fyodorovich et. al., "Method of Inorganic Fibers Production from Rocks", Ukrainian Patent No. UA (11) 10762 (13) A—Published Dec. 25, 1996.*

First Examination Report for Korean Patent Application No. 10-2006-0055086 dated Mar. 27, 2007 (3 pages).

Office Action dated Jun. 16, 2009.

Communication and European Search Report for European Application No. EP 06253154.6-2122, mailed Sep. 28, 2006 (4 pages).

Van De Velde, K., et al., "Basalt Fibres as Reinforcement for Composites," *available at* http://www.basaltex.com/logos/Basalt%20fibres.pdf, published Feb. 13, 2005 (2 pages).

Chinese Office Action issued May 8, 2009.

* cited by examiner

METHOD FOR MANUFACTURING BASALT FIBER

BACKGROUND OF THE INVENTION

1. Field of the Invention

The present invention relates to a method for manufacturing basalt fiber that has superior sound-absorbing and heat-resistance properties, a manufactured basalt filament, and an apparatus for manufacturing basalt filament. More specifically, the invention relates to inexpensive heat-resistant basalt filament having superior sound-absorbing and heat-resistance properties that can be suitably used for automobile mufflers and the like.

2. Background Art

Automobile mufflers are components for absorbing exhaust noise. They currently employ glass fiber as a sound-absorbing material. As a result of the recent trend toward measures for saving more and more energy in automobile engines and increasingly stringent exhaust gas emission regulations, engine temperature has become higher. This has resulted in the exhaust gas temperature of 800° C. or higher at the muffler. Thus, there is an acute need to provide the sound-absorbing material in mufflers with higher heat-resistance property (to cope with temperatures of 850 to 900° C.).

In an example of the manufacture of heat-resistant glass fiber, E glass fiber is treated with an acid. Specifically, conventional E glass fiber having the composition of 50 to 63 wt. % of $SiO_2$, 12 to 16 wt. % of $Al_2O_3$, 8 to 13 wt. % of $B_2O_3$, 15 to 20 wt. % of CaO+MgO, and trace amounts of $Na_2O+K_2O$ is subjected to an immersion treatment using, e.g., 9 to 12 wt. % concentration of hydrochloric acid at 40 to 70° C. for approximately 30 minutes to several hours. This results in the formation of silica glass in the surface layer portion having a $SiO_2$ content of not less than 80 percent by weight, thus providing the fiber with heat-resistance property.

The acid-treated E glass fiber is advantageous in that it can be easily and cheaply spun due to the large difference between its spinning temperature and liquid-phase temperature. However, as a sound-absorbing material for the mufflers where the exhaust gas temperature can run as high as 700° C. or higher, the heat-resistance property of the fiber is not sufficient and impractical. While S glass fiber has high heat-resistance property and could be used as sound-absorbing material, it is very expensive.

JP Patent Publication (Kokai) No. 2001-206733 A discloses a heat-resistant glass fiber suitable for use in the automobile mufflers where the exhaust gas temperature reaches 800° C. or higher. The glass fiber has a glass composition containing, for the fiber as a whole and in substantial percentage by weight terms, 56 to 58.5% of $SiO_2$, 12 to 17% of $Al_2O_3$, 16 to 27% of CaO, 1 to 9% of MgO, 0 to 1% of $Na_2O$, and 0 to 1% of $K_2O$, and not containing $B_2O_3$ nor $F_2$, where the surface layer portion is formed of silica glass containing 90 wt. % or more of $SiO_2$. The patent document also discloses a heat-resistant glass fiber obtained by subjecting the surface of the glass fiber of the aforementioned composition to an acid treatment with mineral acid.

Meanwhile, basalt fiber, which is made from naturally occurring basalt ore, is very inexpensive as compared with conventional glass filament. However, when it is used at high temperatures of approximately 750° C. to 900° C., crystalline phase develops from the glass component, resulting in the disappearance of flexibility, peeling at the interface between the crystalline layer and the glass layer, and other problems.

Specifically, these problems are:

(1) Commercially available glass fiber that consists primarily of $SiO_2$, $Al_2O_3$, and CaO, suffers from sound-absorbing and durability properties problems when exposed to high-temperature (approximately 800° C.) gas in the exhaust system.

(2) Commercially available glass fiber that consists primarily of $SiO_2$, $Al_2O_3$, and MgO suffers from the sound-absorbing and durability properties problems when exposed to high-temperature (approximately 830° C.) gas in the exhaust system.

(3) Commercially available glass filament is expensive.

(4) Application of basalt fiber using naturally occurring material is being considered to solve the above problems (1) to (3). Typical examples are the two kinds of basalt fiber that are compositionally stable and available in large quantities, namely an ore having a larger amount of $SiO_2$ (A, for high-temperature applications) and an ore having a smaller amount of $SiO_2$ (B, for intermediate-temperature applications), both of which have approximately the same amount of $Al_2O_3$. Although ore B can be spun into fiber, the resultant basalt fiber has heat-resistance problem at temperature ranges exceeding 750° C. Ore A, on the other hand, is associated with higher energy cost for mass production of fiber.

(5) Thus, no sound-absorbing glass fiber or heat-insulating component material for automotive applications that satisfies the requirements for heat resistance, low cost, and high durability has been available.

JP Patent Publication (Kokai) No. 2001-315588 A discloses an invention whereby basalt fiber is added in a resin for automobile interior material.

SUMMARY OF THE INVENTION

Researches conducted by the inventors have revealed that the aforementioned problems, which are caused by the use of basalt filament made from naturally occurring basalt ore, are due to the following causes.

(1) Partial crystallization of a perfect glass phase develops, and the development of a Ca—Si—O low-melting point crystal phase causes the fibers to be bound with one another, resulting in solidification and loss of flexibility, with the apparent fiber diameter having increased over the diameter of single fiber by several folds.

(2) A perfect glass phase is completely transformed into a crystalline phase, resulting in loss of flexibility.

(3) Commercially available glass fiber is manufactured by mixing oxide materials including a glass network former and a network modifier to a predetermined composition and melting the mixture at high temperature, resulting in high manufacturing cost due to the high material cost, the need for the powder-mixing process, and the high material-melting temperature.

(4) Basalt fiber is made from a natural material and therefore its manufacturing cost is lower than that of commercially available glass fiber. While ore B for intermediate temperature has less $SiO_2$ and its viscosity in a high-temperature molten material is low, thereby allowing the manufacture of filament having a fiber diameter of 20 mµ or less, the glass phase crystallizes at temperature of 750° C. or higher, which makes the material inferior in terms of heat-resistance property. On the other hand, ore A for high temperature can maintain its glass phase at high temperature, although crystallization develops at approximately 850° C., and it has high heat-resistance property. However, it has high viscosity at high temperature, which makes it necessary to increase the melting temperature for mass production, resulting in an increase in energy cost.

Therefore, it is necessary to form and maintain a network former and a glass modifier using basalt ore, prevent the crystallization and binding of basalt fiber, and significantly increase the heat-resistance property of basalt fiber from the conventional 750° C. to 850 or 900° C., as well as achieving a significant cost reduction over conventional products.

It is therefore an object of the invention to solve the aforementioned problems and establish a method for manufacturing basalt filament using the basalt material.

The invention is based on the inventors' realization that basalt filament having superior heat-resistance property can be manufactured by selecting the melting condition of basalt ore. The inventors have also realized that the crystallization and binding of basalt fiber can be inhibited and a significantly improved heat-resistance property can be achieved by selecting the oxide for the network former and the glass modifier with respect to basalt ore and optimizing their amounts added.

In one aspect, the invention provides a method for manufacturing basalt filament, comprising the steps of: grinding basalt rock as a material; washing a resultant ground rock; melting the ground rock that has been washed; transforming a molten product into fiber; and drawing the fiber in an aligned manner, and winding it. The temperature of the molten product in the melting step is 1400 to 1650° C., and log η is 2.15 to 2.35 dPa·s and more preferably 2.2 to 2.3 dPa·s, where η is the viscosity of the molten product.

The melting conditions in accordance with the invention make it possible to control the fiber diameter and manufacture basalt filament that is not severed during the drawing/aligning and winding steps.

As described above, the temperature of the molten product in the melting step is 1430 to 1610° C. Preferably, the temperature is 1530 to 1550° C.

In the method for manufacturing basalt filament according to one of above-mentioned technical solutions, the basalt rock material is selected from: (1) high-temperature ore (A) having substantially the same amount of $Al_2O_3$ and a larger amount of $SiO_2$; (2) intermediate-temperature ore (B) having substantially the same amount of $Al_2O_3$ and a smaller amount of $SiO_2$; and (3) a mixture of the high-temperature basalt rock ore (A) and the intermediate-temperature basalt rock ore (B).

Preferably, one or more kinds of oxide selected from $Al_2O_3$, $SiO_2$, CaO, and MgO is added to the basalt rock material. Optimum amounts of the oxide added are as follows:
(1) Addition of the oxide is based on one component, of which the amount added, via external addition, is 1.0 to 40 wt. % and preferably 10 to 30 wt. % with respect to 100 wt. % of the basalt rock.
(2) The oxide is based on two components of which the sum of the amounts added, via external addition, is 1.0 to 70 wt. % and preferably 10 to 60 wt. % with respect to 100 wt. % of the basalt rock.
(3) The oxide is based on three or more components of which the sum of the amounts added, via external addition, is 1.0 to 60 wt. % and preferably 10 to 50 wt. % with respect to 100 wt. % of the basalt rock.

In the step of transforming the molten product into fiber, the fiber diameter can be adjusted by controlling the rate at which the molten product, which is completely melted at a predetermined temperature and which is dropped through an opening provided at the bottom of a platinum bush, is transformed into fiber and wound.

In a second aspect, the invention provides basalt filament manufactured by the above method.

In a third aspect, the invention provides a heat-resistant sound-absorbing material comprising the aforementioned basalt filament.

In a fourth aspect, the invention provides a muffler comprising the aforementioned basalt filament as a heat-resistant sound-absorbing material.

In a fifth aspect, the invention provides an apparatus for manufacturing basalt filament from basalt rock material, comprising: a hopper for feeding a material that is obtained by grinding the basalt rock and washing a resultant ground product; a furnace for melting the washed product with a heating means; a platinum bush comprising a number of openings in a lower portion thereof through which the molten product is transformed into fiber; and a winder for drawing the fiber in an aligned manner and winding it thereon.

The melting conditions in accordance with the invention allow the fiber diameter to be controlled and make it possible to manufacture basalt filament that is not severed during the winding step.

Furthermore, in accordance with the invention, the crystallization and binding of basalt fiber can be inhibited and heat-resistance property can be greatly improved by properly selecting the oxide for a network former and a glass modifier and optimizing the amount thereof added with respect to basalt ore, and using two kinds of basalt rock ore containing different amounts of elements, namely, a high-temperature ore (A) containing substantially the same amount of $Al_2O_3$ and a larger amount of $SiO_2$, and an intermediate-temperature ore (B) containing a smaller amount of $SiO_2$.

Basalt rock (basalt ore) as a material for the basalt fiber according to the invention is a kind of igneous rock. Major examples of the constituent mineral include: (1) plagioclase: $Na(AlSi_3O_8)$—$Ca(Al_2SiO_8)$; (2) pyroxene: (Ca, Mg, $Fe^{2+}$, $Fe^{3+}$, Al, $Ti)_2[(Si, Al)_2O_6]$; and (3) olivine: $(Fe, Mg)_2SiO_4$. Ukrainian products are inexpensive and good-quality.

Tables 1 and 2 show examples of element ratios (wt. %) and the oxide-equivalent composition ratios (wt. %) determined by ICP analysis (using an inductively coupled plasma spectrometer ICPV-8100 by Shimadzu Corporation) performed on a high-temperature basalt ore (for high-temperature applications), an intermediate-temperature basalt ore (for intermediate-temperature applications), and a glass consisting of 85% high-temperature ore and 15% intermediate-temperature ore.

TABLE 1

| | Ore (for high-temp.) (wt %) | Ore (for intermediate-temp.) (wt %) | Ore (for high-temp.) 85 wt % Ore (for intermediate-temp.) 15 wt % (wt %) |
|---|---|---|---|
| Si | 23.5~28.8 | 23.5~28.5 | 25.0~28.8 |
| Al | 8.7~9.3 | 8.7~9.3 | 9.0~9.5 |
| Fe | 6.0~6.6 | 6.0~7.1 | 5.7~6.7 |
| Ca | 4.0~4.5 | 5.6~6.1 | 4.2~4.7 |
| Na | 2.1~2.3 | 1.8~2.0 | 2.0~2.3 |
| K | 1.4~1.8 | 1.2~1.5 | 1.4~1.9 |
| Mg | 0.1~1.6 | 1.4~3.0 | 1.5~1.7 |
| Ti | 0.4~0.6 | 0.5~0.7 | 0.4~0.6 |
| Mn | 0.1~0.2 | 0.1~0.2 | 0.1~0.2 |
| P | 0.05~0.10 | 0.05~0.09 | 0.07~0.10 |
| B | 0.02~0.08 | 0.01~0.06 | 0.03~0.10 |
| Ba | 0.03~0.05 | 0.03~0.05 | 0.09 |
| Sr | 0.02~0.04 | 0.02~0.04 | 0.02~0.05 |
| Zr | 0.01~0.04 | 0.01~0.04 | 0.01~0.03 |
| Cr | 0.01~0.03 | 0.01~0.03 | 0.01~0.03 |
| S | 0.01~0.03 | 0.01~0.03 | 0.01~0.03 |

TABLE 2

|  | Ore (for high-temp.) (wt %) | Ore (for intermediate-temp.) (wt %) | Ore (for high-temp.) 85 wt % Ore (for intermediate-temp.) 15 wt % (wt %) |
|---|---|---|---|
| $SiO_2$ | 57.1~61.2 | 54.0~58.2 | 57.7~60.6 |
| $Al_2O_3$ | 16.1~19.2 | 14.9~18.1 | 16.5~18.9 |
| $FeO + Fe_2O_3$ | 8.0~9.7 | 8.1~9.6 | 7.7~9.6 |
| CaO | 5.5~6.8 | 7.5~8.8 | 5.8~7.0 |
| $Na_2O$ | 2.8~3.3 | 2.2~2.9 | 2.6~3.2 |
| $K_2O$ | 1.8~2.1 | 1.4~1.8 | 1.8~2.2 |
| MgO | 0.20~2.5 | 1.4~4.8 | 0.2~2.8 |
| $TiO_2$ | 0.7~1.0 | 0.8~1.1 | 0.1~0.3 |
| MnO | 0.1~0.3 | 0.1~0.3 | 0.1~0.3 |
| $P_2O_5$ | 0.1~0.3 | 0.1~0.3 | 0.1~0.3 |
| $B_2O_3$ | 0.1~0.3 | 0.04~0.20 | 0.04~0.30 |
| BaO | 0.03~0.07 | 0.02~0.06 | 0.03~0.12 |
| SrO | 0.02~0.06 | 0.02~0.07 | 0.01~0.06 |
| $ZrO_2$ | 0.02~0.05 | 0.02~0.05 | 0.01~0.30 |
| $Cr_2O_3$ | 0.01~0.05 | 0.01~0.05 | 0.01~0.04 |
| SO | 0.01~0.03 | 0.01~0.03 | 0.01~0.03 |

FIG. 1 shows the outline of the steps involved in the manufacture of basalt filament according to the invention. As shown in FIG. 1, the material basalt rock is ground into a predetermined grain size. The resultant ground rock is washed and thrown into a material-feeding hopper of a furnace. The furnace is a gas and/or electric furnace that is surrounded with heat-insulating furnace material. The raw material is heated with a burner via the surface thereof so as to melt it. The molten material passes through a platinum bush having a number of openings at the bottom thereof, whereby the material is transformed into fiber. The fibrous basalt is drawn in an aligned manner by a fiber winding machine and wound thereon.

FIG. 1 also schematically shows a basalt filament manufacturing apparatus used in accordance with the invention. The furnace of the apparatus is characterized in that: (1) it is an independent furnace; (2) each furnace is provided with one bushing; (3) it is based on a batch-furnace concept so as to carry out the procedure involving the basalt rock feeding opening, furnace, bushing, and winding independently. The apparatus has the following advantages:

(1) The furnace can be repaired by partially ceasing production. For example, when there are a plurality of furnaces, they can be repaired regularly while production is maintained.

(2) The apparatus can handle small-lot production, and is also capable of production using different materials.

The basalt rock material is rendered into a completely molten product using the electric or gas furnace at a predetermined temperature. The molten product is drawn via the bottom of the platinum bush at a predetermined rate so as to produce filaments having a filament diameter on the order of several μm to several dozens of μm. For application as sound-absorbing material in particular, the diameter is preferably 15 to 20 μm. The fiber diameter of basalt filament can be controlled by a variety of factors, such as the composition of the molten product, the temperature of the molten product, the high-temperature viscosity of the molten product at a predetermined temperature, and the size, shape, and position of the openings provided in the bottom of the platinum bush. Another important factor involves the control of the pulling force during the step of obtaining fiber. Normally, this is controlled by the rate at which the fiber is wound, namely, the rotation speed. In order to obtain a filament, it is indispensable that the fiber is not severed during winding. Thus, it is also important to optimize the factors that determine the fiber diameter, including the factor that prevents the breakage of fiber. Thus, in accordance with the invention, it is important to obtain a filament without severing the fiber having a diameter of several dozens of μm.

In the method for manufacturing basalt rock filament using basalt rock material, it is important to adjust the temperature and viscosity of a molten product. It is indispensable that the viscosity of the molten product at high temperature is measured accurately and that the method is controlled such that an optimum viscosity can be obtained depending on the composition of the material. Herein, the viscosity of glass is measured (a sample pull-down method) in order to evaluate the high-temperature viscosity of a molten product. The principle of the sample pull-down method is based on the fact that, when a Pt sphere moves with constant velocity in a glass molten body, the viscosity is determined by Stokes' law as follows:

$$\eta = GW/v$$

where G is apparatus constant, W is load, and v is the rate at which the Pt crucible is pulled down.

In the following, an embodiment of the invention will be described.

EMBODIMENT

Using the filament manufacturing apparatus shown in FIG. 1, filaments were manufactured using a variety of basalt rock materials. The basalt rocks used include: (1) high-temperature basalt rock (A); (2) intermediate-temperature basalt rock (B); (3) basalt rock material consisting of high-temperature basalt rock (A) to which a one-component system, two-component system, and a three-component system oxide were added; (4) a mixed basalt rock material consisting of high-temperature basalt rock (A) and intermediate-temperature basalt rock (B); and (5) a material consisting of a mixed basalt rock of high-temperature basalt rock (A) and intermediate-temperature basalt rock (B) to which another oxide was added. These materials were fed through the hopper and melted in the gas furnace whose temperature was maintained at a predetermined level. The size of basalt rock may be on the order of several mm to several dozens of mm, or several μm to several dozens of mm. The material feeding rate and the amount of fiber taken out of the platinum bush must be maintained at constant levels so that the liquid level of the molten product can be constant. Various compositions may be adopted for the heat-shielding furnace material. It is necessary, however, that the material does not become corroded too much by the reaction with the molten product or by the molten product. When a mixed material is used, necessary materials may be mixed in advance, or they may be fed separately using a plurality of hoppers such that a predetermined composition is achieved. Observation of the exterior and shape of the resultant fiber showed that a transparent filament with brownish tint had been obtained.

The melting conditions in accordance with the invention allow the fiber diameter to be controlled and, in addition, make it possible to manufacture basalt filament that is not severed during the drawing/aligning and winding steps. Furthermore, in accordance with the invention, the crystallization and binding of basalt fibers can be inhibited, and the heat-resistance property can be significantly improved. As a result, the invention can provide a heat-resistant sound-absorbing material suitable for mufflers and the like at low cost.

What is claimed is:

1. A method for manufacturing basalt filament, comprising the steps of:

grinding basalt rock as a material;
washing a resultant ground rock;
melting the ground rock that has been washed;
transforming a molten product into fiber; and
drawing the fiber in an aligned manner, and winding it, wherein the temperature of the molten product in the melting step is 1400 to 1650° C., and wherein log $\eta$ is 2.15 to 2.35 dPa·s, where $\eta$ is the viscosity of the molten product, wherein the basalt rock material comprises a mixture of a high-temperature basalt rock ore and an intermediate-temperature basalt rock ore, an amount of $Al_2O_3$ in the high-temperature basalt rock ore is substantially the same as an amount of $Al_2O_3$ in the intermediate-temperature basalt rock ore, and an amount of $SiO_2$ in the high-temperature basalt rock ore is larger than an amount of $SiO_2$ in the intermediate-temperature basalt rock ore.

2. The method for manufacturing basalt filament according to claim 1, wherein the temperature of the molten product in the melting step is 1530 to 1550° C.

3. The method for manufacturing basalt filament according to claim 1, wherein one or more kinds of oxide selected from $Al_2O_3$, $SiO_2$, CaO, and MgO is added to the basalt rock material.

4. The method for manufacturing basalt filament according to claim 1, wherein, in the step of transforming the molten product into fiber, the fiber diameter is adjusted by controlling the rate at which the molten product, which is completely melted at a predetermined temperature and which is dropped through an opening provided at the bottom of a platinum bush, is transformed into fiber and wound.

* * * * *